(12) United States Patent
Höck et al.

(10) Patent No.: US 10,844,914 B2
(45) Date of Patent: Nov. 24, 2020

(54) TORQUE LIMITING COUPLING

(71) Applicant: GKN Walterscheid GmbH, Lohmar (DE)

(72) Inventors: Andreas Höck, Lohmar (DE); Martin Hector, Siegburg (DE); Matthias Littau, Alfter (DE)

(73) Assignee: Walterscheid GmbH, Lohmar (DE)

( * ) Notice: Subject to any disclaimer, the term of this patent is extended or adjusted under 35 U.S.C. 154(b) by 189 days.

(21) Appl. No.: 16/133,834

(22) Filed: Sep. 18, 2018

(65) Prior Publication Data

US 2019/0085915 A1   Mar. 21, 2019

(30) Foreign Application Priority Data

Sep. 20, 2017 (EP) .................................. 17192041

(51) Int. Cl.
*F16D 43/206* (2006.01)
*F16D 7/08* (2006.01)

(52) U.S. Cl.
CPC .............. *F16D 43/206* (2013.01); *F16D 7/08* (2013.01)

(58) Field of Classification Search
CPC ........ F16D 43/206; F16D 43/218; F16D 7/08; F16D 7/028
See application file for complete search history.

(56) References Cited

U.S. PATENT DOCUMENTS

| 4,294,340 A | 10/1981 | Kunze |
| 4,538,715 A | 9/1985 | Konrad et al. |
| 5,868,231 A | 2/1999 | Kämpf |
| 2003/0136625 A1* | 7/2003 | Kampf ..................... F16D 7/08 192/56.54 |

FOREIGN PATENT DOCUMENTS

| DE | 3151485 C1 | 1/1983 |
| DE | 2853293 C2 | 12/1983 |
| DE | 19611622 C1 | 7/1997 |
| DE | 10201988 A1 | 9/2003 |

* cited by examiner

*Primary Examiner* — Huan Le
(74) *Attorney, Agent, or Firm* — Bejin Bieneman PLC

(57) ABSTRACT

A torque limiting coupling is arranged rotatably around a longitudinal axis. The torque coupling comprises at least one locking element that is displaceable between a locking position and an unlocking position and that is biased towards the locking position. The locking element is transferable into the locking position in the decoupling position of a switching disc, in which locking position the locking element is supported in a circumferential direction on a coupling hub and on the switching disc, and in which the switching disc is locked against rotation relative to the coupling hub. The at least one locking element is further transferable into the locking position when the switching disc is in its coupling position wherein, in the locking position, the locking element is supported in a circumferential direction on the coupling hub and the switching disc, and the switching disc is locked against rotation relative to the coupling hub.

14 Claims, 8 Drawing Sheets

TORQUE LIMITING COUPLING

CROSS-REFERENCE TO RELATED APPLICATIONS

This application claims priority to European Application No. EP 17192041.6 filed on Sep. 20, 2017, which application is hereby incorporated herein by reference in its entirety.

BACKGROUND

A torque limiting coupling has a coupling hub, having circumferentially distributed through-openings. Driving members are held in the through-opening through openings of the coupling hub and are displaceable parallel to the longitudinal axis. A coupling sleeve has first recesses corresponding to the through-openings. A switching disc is rotatable relative to the coupling hub between a coupling position and a decoupling position. The switching disc has second recesses corresponding to the through-opening, wherein the driving members engage in the decoupling position in the second recesses, and when a predetermined threshold torque is exceeded, the switching disc is transferable from the coupling position into the decoupling position by a rolling movement of the driving members relative to the switching disc. A first spring element acts axially onto the switching disc, wherein, during transmitting torque between the coupling hub and the coupling sleeve, the driving members are acted upon by the switching disc against the coupling sleeve and wherein in the coupling position the driving members are held in the first recesses for the torque transmission. A second spring element acts on the switching disc in circumferential direction towards the coupling position. The torque limiting coupling further comprises at least one locking element, which is displaceable between a locking position and an unlocking position and which is biased towards the locking position, wherein the locking element is transferable into the locking position in the decoupling position of the switching disc, in which the locking element is supported in circumferential direction on the coupling hub and on the switching disc and locks the switching disc against rotation relative to the coupling hub.

Such a torque limiting coupling is known from DE 28 53 293 C2. The locking element holds the switching disc after it is transferred into the decoupling position, to prevent, that the switching disc is transferred automatically into the coupling position. Thus in the decoupling position it is prevented, that the driving members are pushed when passing the first recesses into the coupling sleeve into the same. Thus, noises are prevented in the decoupling position and the life span of the torque limiting coupling is increased. Furthermore it is prevented, that the torque limiting coupling is again automatically switched on, when the torque falls below the threshold torque. For the renewed switching-on of the torque limiting coupling an active actuation of a person is necessary.

A further torque limiting coupling is shown in DE 31 51 485 01. Described is an overload coupling for protecting drive trains, with a driving and a driven coupling part. One of the coupling parts can be formed as a coupling hub and can have circumferentially distributed through-openings, in which rolling member bodies acting as driving members are held, which engage for torque transmission in recesses of the other one of the coupling parts. Furthermore, the overload coupling has a switching ring, held by springs acting in circumferential direction in an angle off-set manner to the other coupling part. The switching ring is provided with recesses corresponding to the recesses of the other coupling part. The driving members are supported during the torque transmission via the switching ring against the force of an axial spring held between two abutments. The switching ring is rotatable when exceeding a predetermined nominal torque by a rolling movement of the driving members out of the recesses of the other coupling part against the force of the spring acting in circumferential direction such, that the recesses of the switching ring are displaceable relative to the through-openings in a corresponding angle position.

SUMMARY

The present disclosure relates to a torque limiting coupling, arranged rotatably around a longitudinal axis. To ensure that the overload coupling is activated independently of the occurrence of rotational vibrations only when exceeding a predetermined nominal torque, at least one retaining pin can be guided in a limited manner axially in the coupling part formed as coupling hub. The retaining pin is held by the force of a spring on the side facing the switching ring projectingly from the coupling hub. On the switching ring, a recess, aligned in the torque transmitting position with the retaining pin, is provided, into which the retaining pin enters and holds the switching ring in the torque transmitting position, till the nominal torque is exceeded. The renewed switching-on of the overload coupling from the free-wheel position into the torque transmission position by simple reduction of the drive spring should not be impeded by the named measures.

The torque limiting coupling on the one hand ensures that a renewed switching-on is only possible by an intentional actuation of a person and on the other hand, that when rotational vibrations are produced, an unintentional activation of the torque limiting coupling is prevented, when a predetermined threshold torque is not yet reached or not yet exceeded.

A torque limiting coupling can be arranged rotatably around a longitudinal axis. The torque limiting coupling has a coupling hub, having circumferentially distributed through-openings. Driving members are held in the through-openings of the coupling hub and are displaceable parallel to the longitudinal axis. A coupling sleeve has first recesses corresponding to the through-openings. A switching disc is rotatable relative to the coupling hub between a coupling position and a decoupling position. The switching disc has second recesses corresponding to the through-opening, wherein the driving members engage in the decoupling position in the second recesses and when a predetermined threshold torque is exceeded, the switching disc is transferable from the coupling position into the decoupling position by a rolling movement of the driving members relative to the switching disc. A first spring element acts axially onto the switching disc, wherein, during transmitting torque between the coupling hub and the coupling sleeve, the driving members are acted upon by the switching disc against the coupling sleeve and wherein in the coupling position the driving members are held in the first recesses for the torque transmission. A second spring element acts on the switching disc in a circumferential direction towards the coupling position. The torque limiting coupling further comprises at least one locking element, which is displaceable between a locking position and an unlocking position and which is biased towards the locking position, wherein the locking element is transferable into the locking position in the decoupling position of the switching disc, in which the locking element is supported in a circumferential direction on the coupling hub and on the switching disc and locks the switching disc against rotation relative to the coupling hub. The at least one locking element is additionally transferable into the locking position when the switching disc is in its coupling position wherein, in the locking position the locking element is supported in circumferential direction on the coupling hub and on the switching disc and the switching disc is locked against rotation relative to the coupling hub.

The at least one locking element has therefore two functions. On the one hand, in the decoupling position of the switching disc, the locking element is transferable into the locking position, in which the locking element is supported in a circumferential direction on the coupling hub and on the switching disc and locks the switching disc against rotation relative to the coupling hub. Thus, the locking element acts as switching-on prevention, preventing that the torque limiting coupling is automatically switched on again, when after exceeding the threshold torque the torque falls again below the threshold torque.

On the other hand, in the coupling position of the switching disc, the at least one locking element is transferable into the locking position, in which the locking element is supported in a circumferential direction on the coupling hub and on the switching disc and locks the switching disc against rotation relative to the coupling hub. Thus, the locking element also acts as rotational vibration limiter, preventing that the torque limiting coupling is switched off when rotational vibrations are produced, without the threshold torque being exceeded.

The insensitivity against rotational vibration is especially advantageous when using the torque limiting coupling in drive trains arranged between a tractor and an agricultural implement, as the universal shafts used here are subjected to large articulations because of the small available space. In agricultural engineering mostly cardan joint shafts with two cardan joints are used. When during the articulation of the cardan joint shaft different articulation angles are produced in the cardan joints, a non-uniform rotational movement transmission and thus rotational vibrations are produced. These can be absorbed by the torque limiting coupling without unintentional switching-off.

The use of the torque limiting coupling is however not limited to the described use case, but is recommended generally for drive trains, in which rotational vibrations are produced and which need to be protected against overload.

In an example the torque limiting coupling has a release element, displaceable between a neutral position and a release position, wherein by means of displacing the release element into the release position, the at least one locking element is transferred by the release element into the unlocking position.

By means of the release element, the at least one locking element can be transferred especially when the torque limiting coupling is switched off, from the locking position into the unlocking position, to be able to switch on the torque limiting coupling again after the occurrence of an overload and the switching-off of the torque limiting coupling. Thus it is ensured that a renewed switching-on of the torque limiting coupling is only possible by means of an intentional action of an operator. The torque limiting coupling cannot be unintentionally and uncontrolled switched on again on its own.

Several locking elements can be provided, which can also be arranged circumferentially distributed and especially evenly distributed. Thus, the force for supporting the coupling hub and the switching disc is distributed onto several locking elements. The individual locking elements can be formed correspondingly smaller than with only one locking element.

In one example the at least one locking element can be accommodated displaceably in a guide recess of the coupling hub. With several locking elements, correspondingly for each individual locking element, one guide recess is provided. In this case, the locking element can be arranged displaceably in the guide recess, especially axially displaceable parallel to the longitudinal recess. However, also a displacement in the direction of rotation is possible.

In the locking position, the at least one locking element may engage in a locking recess in the switching disc. In this case, for each locking element a first locking recess can be provided in which the respective locking element engages in the coupling position of the switching disc. Furthermore, for each locking element a second locking recess can be provided in which the respective locking element engages in the decoupling position of the switching disc.

The at least one locking element can sit with circumferential clearance in the first locking recess and/or in the second locking recess. For this, the width of the first locking recess and/or in the second locking recess can be larger in a circumferential direction than the width of the at least one locking element in the circumferential direction. The circumferential clearance enables that the switching disc can rotate better when exceeding a threshold torque already when the driving bodies roll out of the first recesses of the coupling sleeve.

The release element can be a covering housing of the torque limiting coupling. The covering housing serves to cover or accommodate at least the switching disc, the at least one locking element and at least partially the coupling hub and the coupling sleeve to the outside. For this the covering housing can be formed pot-like.

The release element can be arranged axially displaceably or rotatably relative to the coupling hub.

The release element may have an abutment face, which, when transferring the release element from the neutral position into the release position, transfers the locking element from the locking position into the unlocking position. The abutment face can be formed, for example, as a cone face wherein the release element is axially displaceable.

Furthermore, the at least one locking element may have a stop face against which the abutment face of the release element abuts for transferring the at least one locking element from the locking position into the unlocking position. The abutment face can be formed as a face extending inclined to the longitudinal axis.

According to an example, the at least one locking element is part of a locking ring, which is displaceable between the locking position and the unlocking position. Thus, several locking elements can be part of a single component, to simplify also the assembly.

The locking ring can have in an example a stop face, which forms the stop face of the at least one locking element. In several locking elements, thus, a single stop face is provided, which forms the stop face of all locking elements. The stop face can for example be formed as a circumferentially extending face, forming in portions the faces of the locking elements.

In an example it can be provided, that in the decoupling position of the switching disc the driving members are accommodated with circumferential clearance in the second recesses of the switching disc.

SUMMARY OF THE DRAWINGS

An example is described in the following using the drawings in more detail.
Herein.

DESCRIPTION

Figure 1:
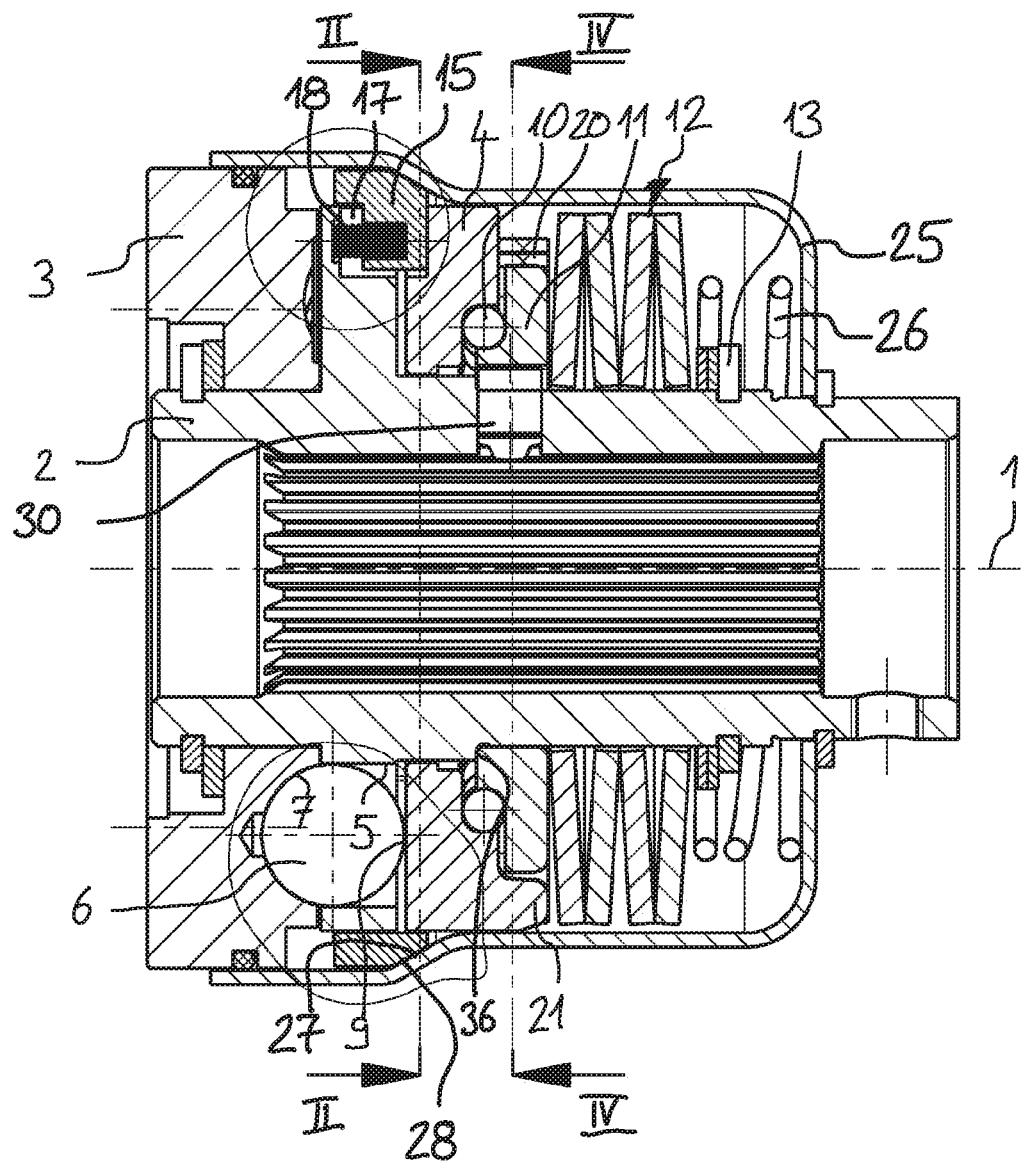
FIG. 1 is a longitudinal sectional view through an example torque limiting coupling in a coupled condition.
Figure 2:
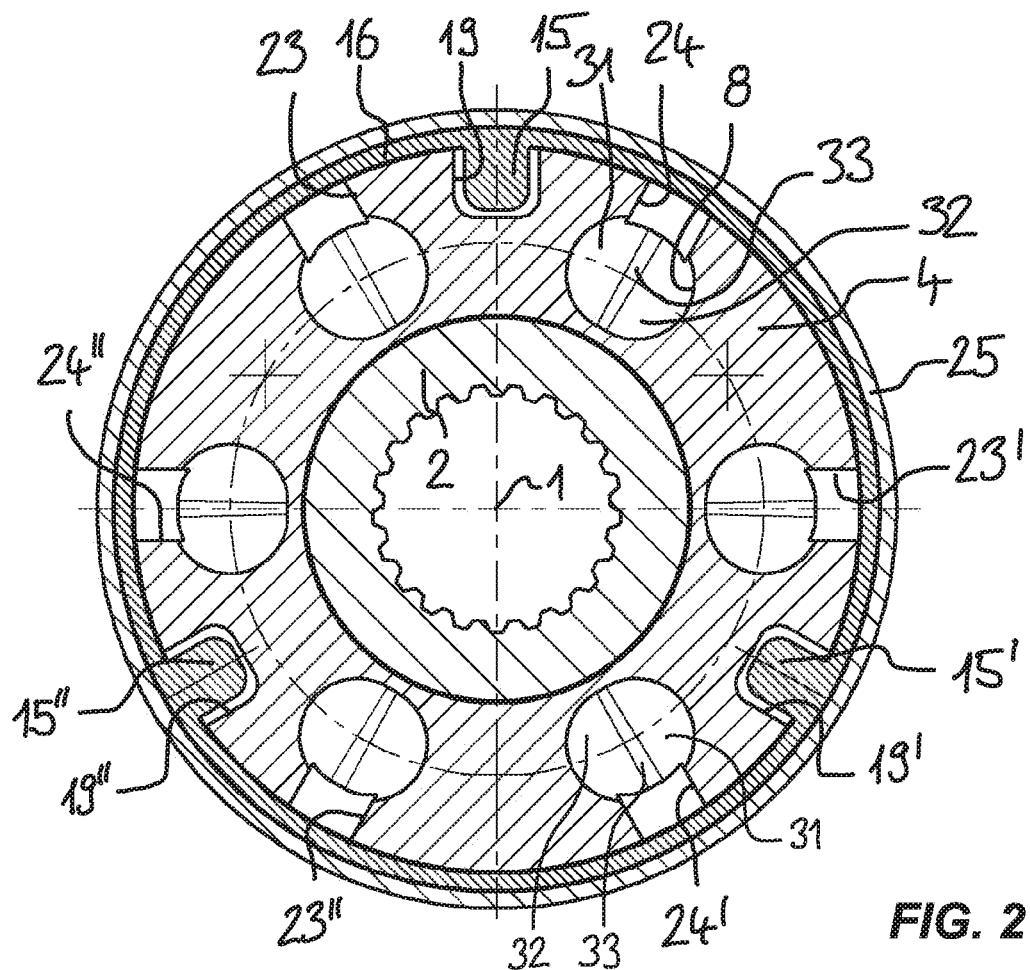
FIG. 2 is a cross-sectional view of the torque limiting coupling of FIG. 1 along the section line II-II.
Figure 3:
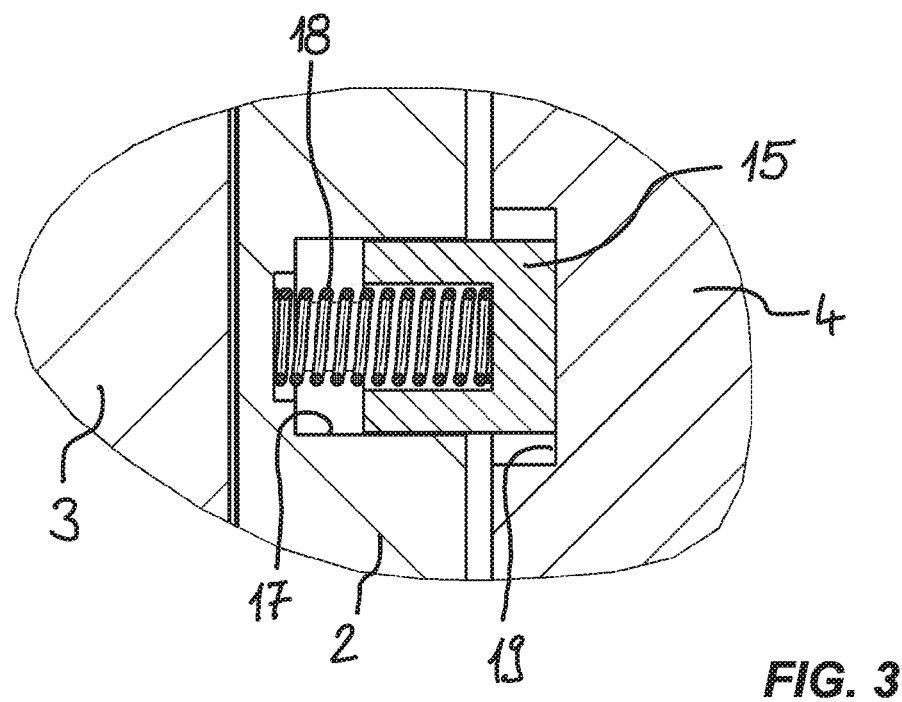
FIG. 3 is a sectional representation of the torque limiting coupling in the area of a locking element in its locking position along the section line III-III of FIG. 2.
Figure 4:
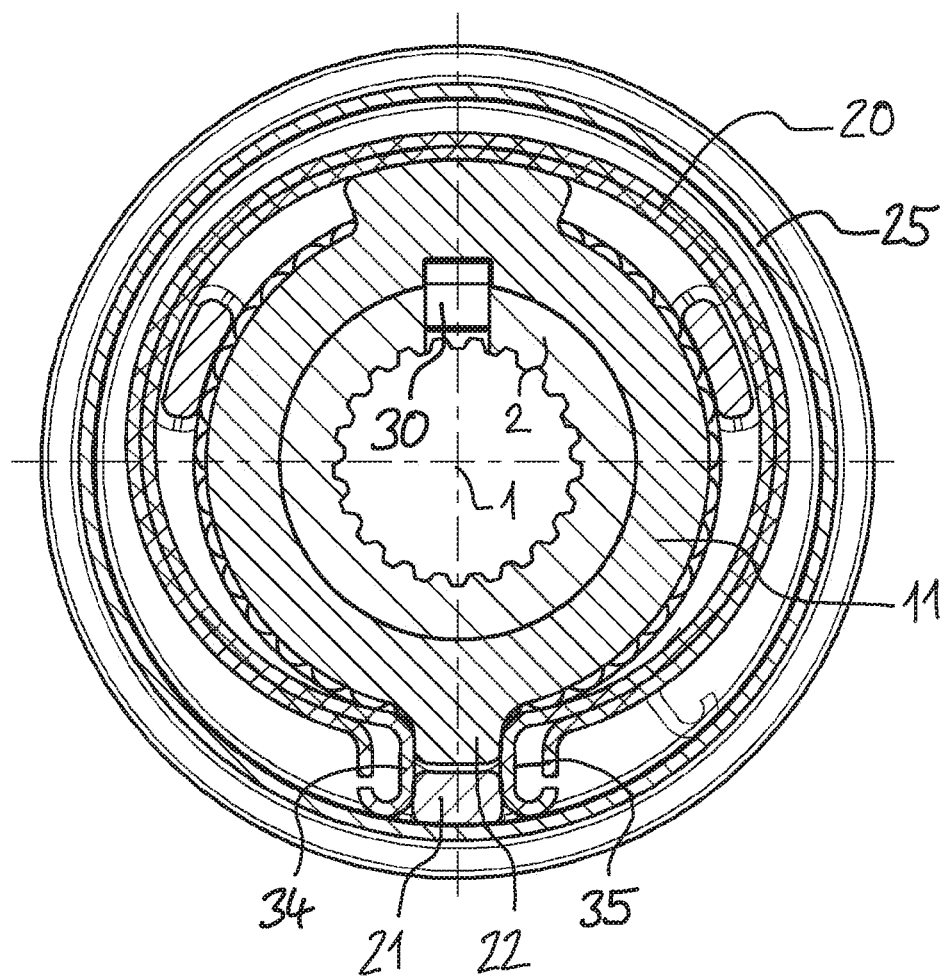
FIG. 4 is a cross-sectional view of the torque limiting coupling of FIG. 1 along the section line IV-IV.
Figure 5:
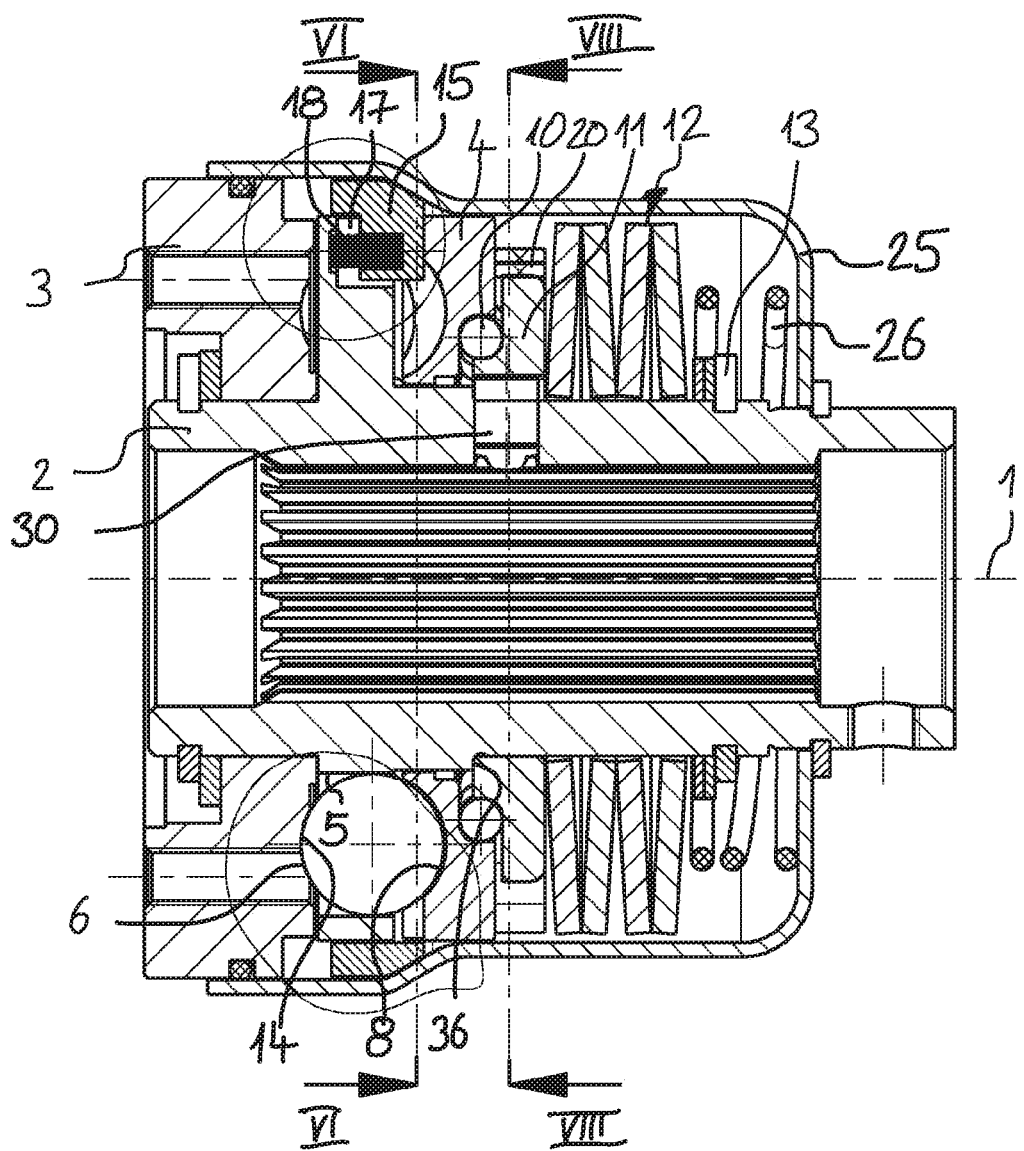
FIG. 5 is a longitudinal sectional view of the torque limiting coupling of FIG. 1 in a decoupled condition.

In FIGS. 1 to 4 an example torque limiting coupling is shown in a torque transmitting position. The Figures are described together herein after.

The torque limiting coupling is arranged rotatably around a longitudinal axis 1 and has a coupling hub 2, a coupling sleeve 3 as well as a switching disc 4. The coupling hub 2 has circumferentially distributed through-openings 5, in which driving members 6 acting as rolling members in the form of balls are held displaceably parallel to the longitudinal axis 1. The driving members 6 can also be formed in other shapes, e.g., in the shape of rollers. The coupling sleeve 3 has first recesses 7 corresponding to the through-openings 5. The switching disc 4 has second recesses 8 corresponding to the through-openings 5. The switching disc 4 is arranged rotatably around the longitudinal axis 1 relative to the coupling hub 2 between a coupled position shown in FIGS. 1 to 4 and a decoupled position shown in FIGS. 5 to 8.

In the coupling position of the switching disc 4 the driving members 6 project in the direction to the coupling sleeve 3 out of the through-openings 5 and engage in the first recesses 7. On the side facing away from the coupling sleeve 3 the driving members 6 also project out of the through-openings 5 and are axially supported on second bearing tracks 9, arranged between the second recesses 8 of the switching disc 4. Alternatively, the switching disc 3 can also be formed without bearing tracks, so that the driving members 6 are supported on an end face of the switching disc. The first recesses 7 of the coupling sleeve 3 and the second recesses 8 of the switching disc 4 are arranged off-set to each other in the switching-on position with respect to their rotational position. The switching disc 4 is axially supported via a thrust bearing 10 on a thrust ring 11, wherein the thrust ring 11 is acted upon by a force of a first spring element in the shape of a Belleville spring packet 12 axially in direction to the switching disc 4. The Belleville spring packet 12 is axially supported on a support ring 13 on the coupling hub 2. Thus, the driving members 6 are held in the first recesses 7. In this case the thrust ring 11 is axially supported on a step 36 of the coupling hub 2. As long as no torque is transmitted, a switching clearance is provided between the driving members 6 and the switching disc 4. Instead of the Belleville spring packet 12, a different suitable spring element or a spring arrangement can be provided, like for example a helical compression spring.

When exceeding a threshold torque, the driving members 6 are pushed out of the first recesses 7 against the spring force of the Belleville spring packet 12, wherein these are compressed by an axial movement of the switching disc 4 in a direction toward the Belleville spring packet 12. The driving members 6 roll, in this case, in the second bearing tracks 9 of the switching disc 4 as well as in the first bearing tracks 14 (FIG. 5) between the first recesses 7 of the coupling sleeve 3. Because of the rolling movement of the driving members 6, the switching disc 4 is rotated relative to the coupling hub 2 around the longitudinal axis 1 against the force of a second spring element, in form of a tightening clamping packet 20, in a circumferential direction. Alternatively, the coupling sleeve 3 can be formed also without bearing tracks, so that the driving members 6 are supported on an end face of the coupling sleeve 3. According to the representations in FIGS. 2 and 6, the switching disc is rotated clockwise. Generally, the rotation can also take place in the other direction or in both directions.

In the decoupling position of the switching disc 4, the driving members 6 engage in the second recesses 8, wherein the switching disc 4 is moved back because of the spring force of the first spring element in the shape of the Belleville spring packet 12 axially in direction to the coupling sleeve 3. In this switching position the torque transmission between the coupling sleeve 3 and the coupling hub 2 is interrupted, so that the coupling sleeve 3 rotates relative to the coupling hub 2, wherein the driving members 6 roll in the first bearing tracks 14 of the coupling sleeve 3 or are accommodated with axial clearance in the second recesses 8 in an unmoved manner.

Figure 9:
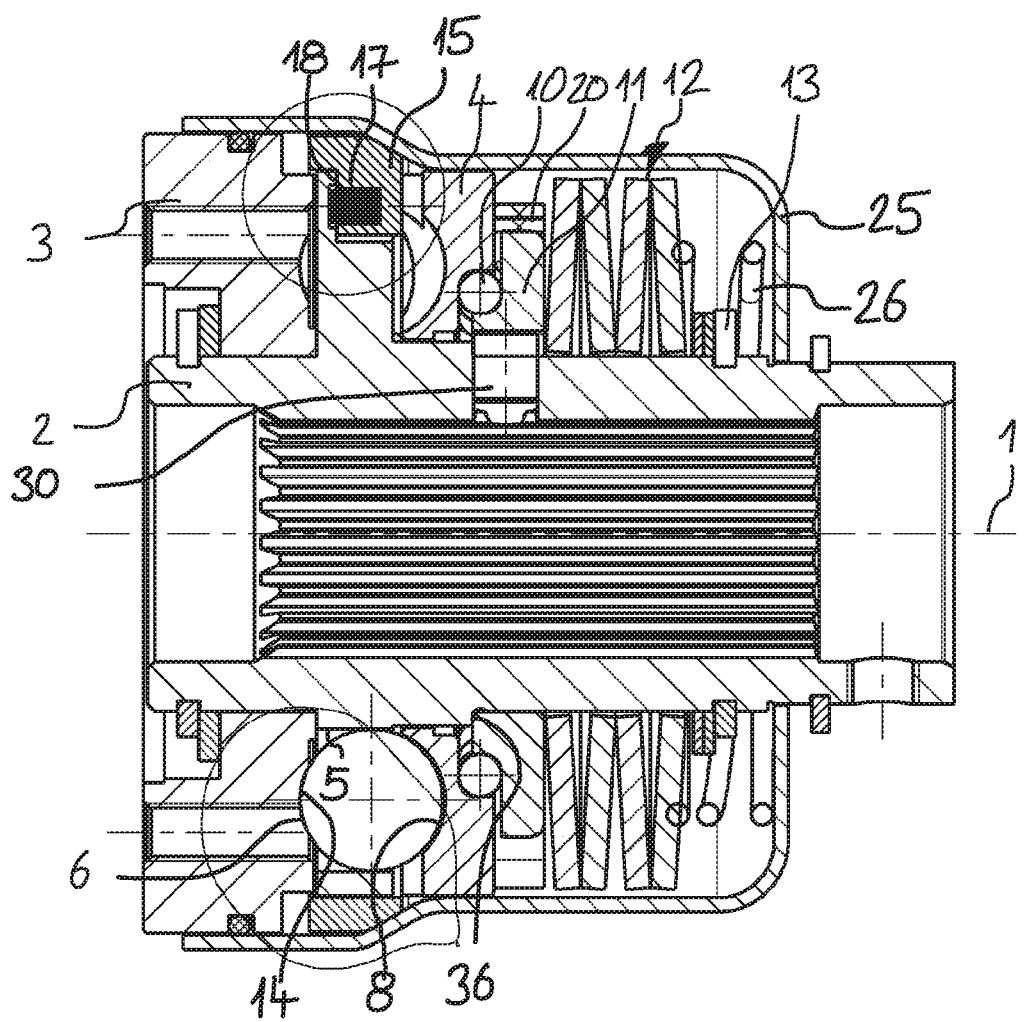
FIG. 9 is a longitudinal sectional view of the torque limiting coupling of FIG. 1 in a decoupled condition and with the release element in its release position.
Figure 10:
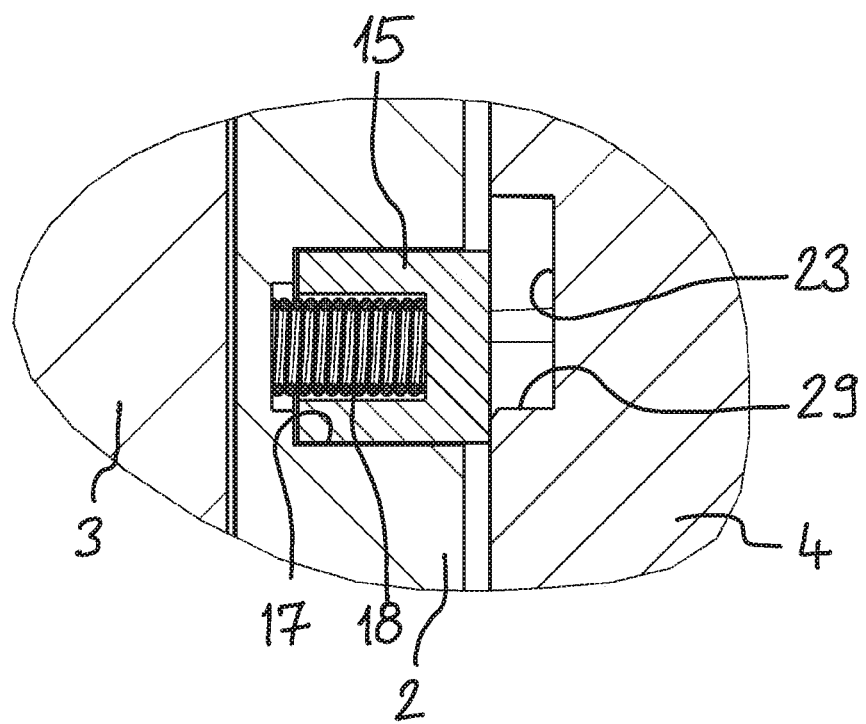
FIG. 10 is a sectional representation of the torque limiting coupling in the area of a locking element in its unlocking position according to FIG. 7.

Especially when using the torque limiting coupling in universal joint shafts arranged between a tractor and an agricultural implement, rotational vibrations can occur, which can cause the torque limiting coupling to already disengage before exceeding a predetermined threshold torque. To prevent this, several locking elements 15, 15', 15", distributed around the circumference, can be provided. In the illustrated example three locking elements 15, 15', 15" are arranged. However, any other number of locking elements is possible, like for example a single locking element. The locking elements 15, 15', 15" are part of a locking ring 16 and project radially inwards. The locking ring 16 is arranged around the coupling hub 2, wherein the locking elements 15, 15', 15" engage radially inwards in guide recesses 17, 17', 17". The locking elements 15, 15', 15" are displaceable in these guide recesses 17, 17', 17" axially parallel to the longitudinal axis 1 between a locking position (FIGS. 1, 3, 5 and 7) and an unlocking position (FIGS. 9 and 10). In the illustrated example the locking elements 15, 15', 15" are displaceable.

The guide recesses 17, 17', 17" open in a direction to the switching disc 4, wherein the locking elements 15, 15', 15" are acted upon by a force of a spring 18 in a direction toward the switching disc 4. In the coupling position the locking elements 15, 15', 15" engage respectively in a first locking recess 19, 19', 19" of the switching disc 4, as this is especially visible in FIG. 3. Thus the switching disc 4 is held in its coupling position.

Generally also other displacement directions or movements of the locking elements 15, 15', 15", are possible like, for example, rotational movements or combined rotational movements and displacement movements, provided that they unlock/release in the unlocking position the switching disc and lock the switching disc in the locking position.

The locking elements 15, 15', 15" are accommodated with a circumferential clearance in the first locking recesses 19, 19', 19", so that a limited rotational movement is possible between the switching disc 4 and the coupling hub 2. For this the first locking recesses 19, 19', 19" are formed, when seen in the circumferential direction, wider than the locking elements 15, 15', 15".

Furthermore, the driving members 6 are accommodated with a circumferential clearance in the second recesses 8 of the switching disc 4. All second recesses 8 are formed identically and are provided with the same reference numeral because of simplicity. To form the circumferential clearance, the second recesses are formed, when seen in circumferential direction, wider than those portions of the driving members 6, entering the second recesses 8. Thus, a limited rotational movement is possible between the coupling hub 2 and the switching disc 4, without the switching disc 4 being already axially displaced against the spring force of the Belleville spring packet 12. The second recesses 8 are formed spherically in two end portions 31, 32 arranged in rotational direction at the ends of the second recesses 8 and are adapted to the spherical surfaces of the driving members 6, so that the driving members 6 fit tightly to the same at these end portions 31, 32 of the second recesses 8. In a central portion 33 between the two spherical end portions 31, 32, the second recesses 8 are formed flattened or straight respectively in the circumferential direction, so that a circumferential clearance is achieved within the second recesses 8 for the driving members 6.

The switching disc 4 has a first projection 21 projecting axially beyond the thrust ring 11. The thrust ring 11 has a second projection 22, projecting radially outwards. In the coupling position of the switching disc 4, the first projection 21 and the second projection 22 are aligned in a radial direction. Around the thrust ring 11, the tightening clamping packet 20 is arranged, which is formed with two legs 34, 35 extending approximately radially, wherein each of the two legs 34, 35 is supported on both projections 21, 22 in a circumferential direction. The thrust ring 11 is held by means of a tongue and groove connection 30 non-rotatingly on the coupling hub 2.

When transferring the switching disc 4 from the coupling position to the decoupling position, the switching disc 4 is rotated relative to the coupling hub 2 and the thrust ring 11, held non-rotatingly thereto. In this case, one of the legs 34 is supported in the circumferential direction on the second projection 22 of the thrust ring 11 and the other of the two legs 35 is supported in the circumferential direction on the first projection 21 of the switching disc 4. Thus, the tightening clamping packet 20 is expanded or biased in the circumferential direction, so that the switching disc 4 is acted upon by a force to take up a switching-on position in the circumferential direction.

Instead of the tightening clamping packet 20 also other spring means are possible, like for example a helical compression spring or similar means acting in a circumferential direction.

When the torque falls below the threshold torque, the driving members 6 can be pushed by the switching disc 4 into the first recesses 7 of the coupling sleeve 3 because the switching disc 4 is acted upon to take up the switching-on position. When the difference of the numbers of rotations between the coupling hub 2 and the coupling sleeve 3 falls below a specific value, the switching disc 4 is rotated back into the coupling position, when the driving members 6 run over the first recesses 7. If the threshold torque is then sufficiently exceeded, the switching disc 4 can remain in the coupling position and the torque limiting coupling remains correspondingly switched on.

Figure 6:
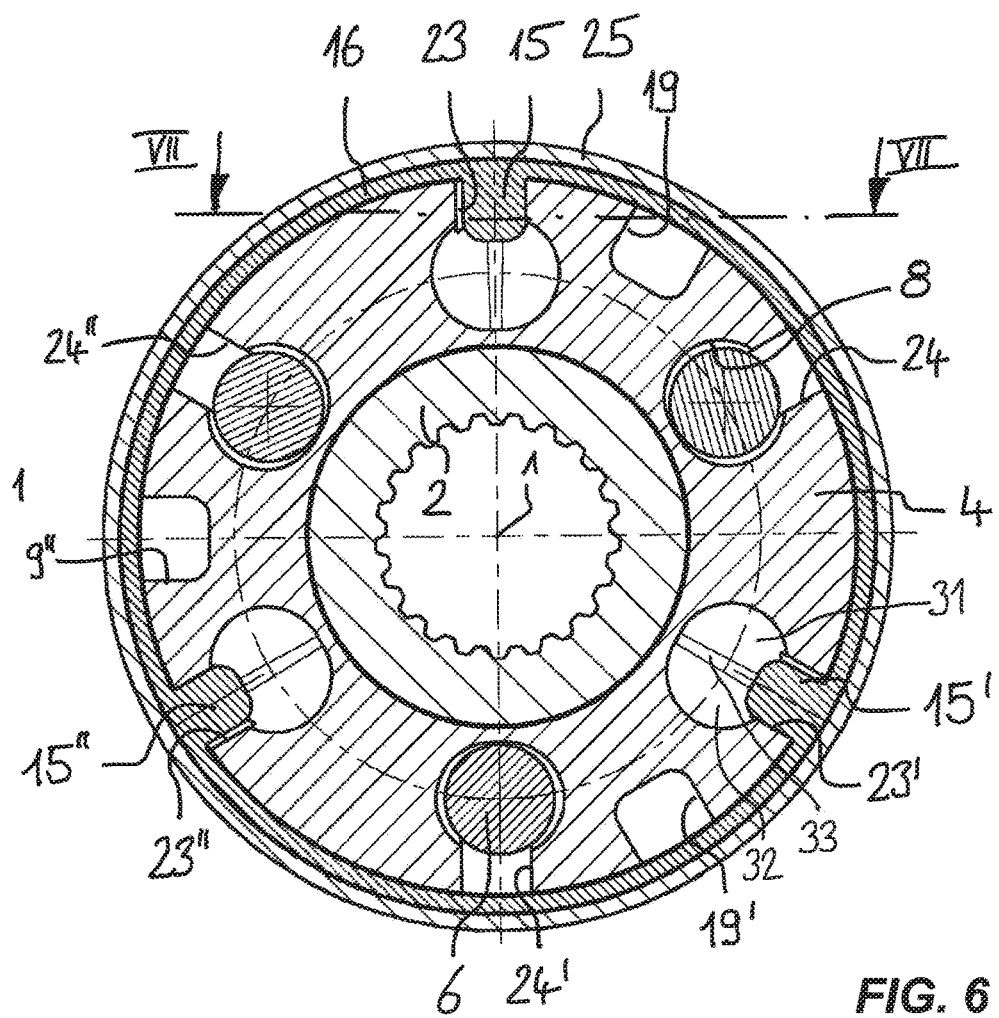
FIG. 6 is a cross-sectional view of the torque limiting coupling of FIG. 5 along the section line VI-VI.

To prevent this automatic switching-on, second locking recesses 23, 23', 23", 24, 24', 24" are arranged in the switching disc 4. In the illustrated example, the locking elements 15, 15', 15" engage in their locking position and in the decoupling position of the switching disc 4 in second locking recesses 23, 23', 23", which in the representation of FIG. 6, are arranged respectively anti-clockwise each neighbouring one of the first locking recesses 19, 19', 19". When switching-off in the other rotational direction, the locking elements 15, 15', 15" can engage in the second locking recesses 24, 24', 24", which in the representation of FIG. 6 are arranged respectively clockwise neighbouring one of the first locking recesses 19, 19', 19".

Thus, the switching disc 4 is supported against the force of the tightening clamping packet 20 on the locking elements 19, 19', 19" (FIG. 7) and held in the decoupling position.

For releasing the locking elements 15, 15', 15", i.e., when transferring the locking elements 15, 15', 15" from the locking position into the unlocking position, a release element 25 is provided. The release element 25 is represented in the shown embodiment by a covering housing, which accommodates the Belleville spring packet 12, the thrust ring 11, the switching disc 4 and partially the coupling hub 2 as well as partially the coupling sleeve 3. The release element 25 can however also alternatively be formed as a separate component.

The release element 25 is guided displaceably against the force of a compression spring 26 between a neutral position and a release position on the coupling hub 2. Also possible is a different displaceability of the release element 25, like for example the rotatability of the release element 25. Furthermore, instead of a compression spring a different spring element can be used.

The release element 25 has an abutment face 27, with which the release element 25, when transferring from the neutral position to the release position, transfers the locking elements 15, 15', 15" from the locking position to the unlocking position. The abutment face 27 is an inner face of the covering housing made from sheet metal and is formed conically, wherein the cone angle of the conical abutment face 27 opens in direction to the locking ring 16. Also a different design of the abutment face 27 is possible.

The abutment face 27 interacts in this case with stop faces 28 of the locking elements 15, 15', 15", wherein the stop faces 28 merge on the locking ring 16 into one another in a circumferential direction, such that these form a continuous stop face 28. Also the stop face 28 is formed conically and has the same cone angle, like the conical abutment face 27. Also a different design of the abutment face 27 and of the stop face 28 is possible.

Figure 7:
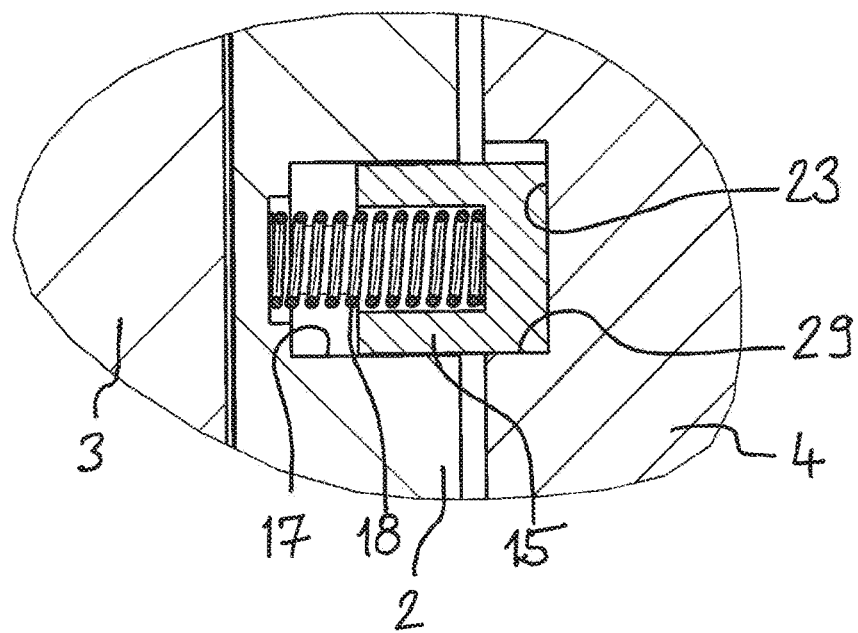
FIG. 7 is a sectional representation of the torque limiting coupling in the area of a locking element in its locking position along the section line VII-VII of FIG. 6.
Figure 8:
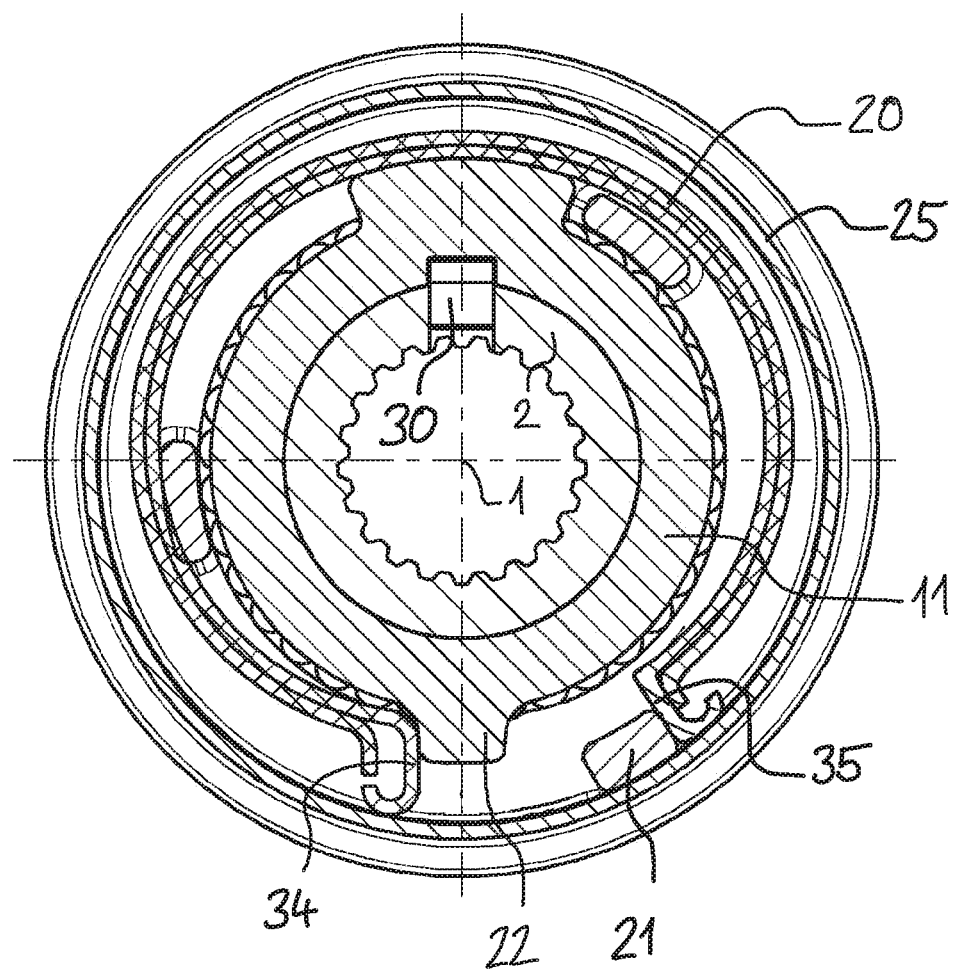
FIG. 8 is a cross-sectional view of the torque limiting coupling of FIG. 5 along the section line VIII-VIII.

In the decoupling position of the switching disc 4 and in the locking position of the locking elements 15, 15', 15", the locking elements 15, 15', 15" are pushed respectively against a locking face 29 of the respective second locking recess 23, 23', 23", 24, 24', 24" (FIG. 7). In this position of the switching disc 4, the driving members 6 are arranged at least approximately in the centre of the second recesses 8 (FIG. 6). When transferring the locking elements 15, 15', 15" into the unlocking position, thus the switching disc 4 is slightly rotated by the force of the tightening clamping packet 20 because of the circumferential clearance between the driving members 6 within the second recesses 8. Because of this, the locking elements 15, 5', 15" do not align anymore with the second locking recesses 23, 23', 23", 24, 24', 24" in the circumferential direction (FIG. 10). When transferring the release element 25 back into the neutral position, therefore, the locking elements 15, 15', 15" do not re-engage in the second locking recesses 23, 23', 23", 24, 24', 24". Thus it is ensured that during a short actuation of the release element 25 by an operator a renewed locking of the coupling disc is prevented. As the torque limiting coupling is stopped for actuating the release element 25, now the torque limiting coupling can be again switched on, when again accelerating the drive train, in which the torque limiting coupling is arranged.

REFERENCE NUMERALS LIST 1 longitudinal axis
2 coupling hub
3 coupling sleeve
4 switching disc
5 through-opening
6 driving member
7 first recess
8 second recess
9 second bearing track
10 thrust bearing
11 thrust ring
12 Belleville spring packet
13 support ring
14 first bearing track
15, 15', 15" locking element
16 locking ring
17, 17', 17" guide recess
18 spring
19, 19', 19" first locking recess
20 spring (tightening clamping packet)
21 first projection
22 second projection
23, 23', 23" second locking recess
24, 24', 24" second locking recess
25 release element/coupling housing
26 compression spring
27 abutment face
28 stop face
29 locking face
30 tongue and groove connection
31 end portion
32 end portion
33 central portion
34 leg
35 leg
36 step

The invention claimed is:

1. A torque limiting coupling, arranged rotatably around a longitudinal axis, comprising:
a coupling hub having circumferentially distributed through-openings;
driving members arranged in the through-openings of the coupling hub and that is displaceable parallel to the longitudinal axis;
a coupling sleeve having first recesses corresponding to the through-openings;
a switching disc that is rotatable relative to the coupling hub between a coupling position and a decoupling position and that has second recesses corresponding to the through-openings, wherein the driving members engage in the decoupling position in the second recesses, and when a predetermined threshold torque is exceeded the switching disc is transferrable from the coupling position into the decoupling position by a rolling movement of the driving members;
a first spring element axially biasing the switching disc, wherein during a torque transmission between the coupling hub and the coupling sleeve the driving members are biased by the switching disc against the coupling sleeve and wherein in the coupling position the driving members are held in the first recesses for torque transmission;
a second spring element biasing the switching disc in a circumferential direction towards the coupling position; and
at least one locking element that is displaceable between a locking position and an unlocking position and that is biased towards the locking position, wherein the locking element is transferrable into the locking position in the decoupling position of the switching disc, and when the locking element is in the locking position the locking element is supported in the circumferential direction against the coupling hub and against the switching disc and in which the switching disc is locked against rotation relative to the coupling hub;
wherein the at least one locking element is further transferrable into the locking position when the switching disc is in its coupling position, and when the locking element is in the locking position, the locking element is supported in the circumferential direction against the coupling hub and against the switching disc and the switching disc is locked against rotation relative to the coupling hub.

2. The torque limiting coupling of claim 1, wherein the torque limiting coupling further comprises a release element that is displaceable between a neutral position and a release position, wherein by displacing the release element into the release position the at least one locking element is transferred by the release element into the release position.

3. The torque limiting coupling of claim 2, wherein the release element is a covering housing of the torque limiting coupling.

4. The torque limiting coupling of claim 2, wherein the release element is axially displaceable.

5. The torque limiting coupling of claim 2, wherein the release element has an abutment face, wherein the release element transfers the locking element from the locking position into the unlocking position with said abutment face, when transferring the release element from the neutral position into the release position.

6. The torque limiting coupling of claim 5, wherein the at least one locking element has a stop face, wherein the abutment face of the release element abuts said stop face for transferring the at least one locking element from the locking position into the unlocking position.

7. The torque limiting coupling of claim 1, wherein several locking elements are distributed in a circumferential direction.

8. The torque limiting coupling of claim 1, wherein the at least one locking element is accommodated displaceably in a guide recess of the coupling hub.

9. The torque limiting coupling of claim 8, wherein the at least one locking element is axially displaceable in the guide recess.

10. The torque limiting coupling of claim 1, wherein in its locking position the at least one locking element engages in a first locking recess of the switching disc when the switching disc is in its coupling position.

11. The torque limiting coupling of claim 1, wherein in its locking position the at least one locking element engages in a second locking recess of the switching disc when the switching disc is in its decoupling position.

12. The torque limiting coupling of claim 1, wherein the at least one locking element is part of a locking ring, which is displaceable between the locking position and the unlocking position.

13. The torque limiting coupling of claim 12, wherein the locking ring has a stop face, which forms the stop face of the at least one locking element.

14. The torque limiting coupling of claim 1, wherein in the decoupling position of the switching disc the driving members are accommodated with a circumferential clearance in the second recesses of the switching disc.

* * * * *